UNITED STATES PATENT OFFICE.

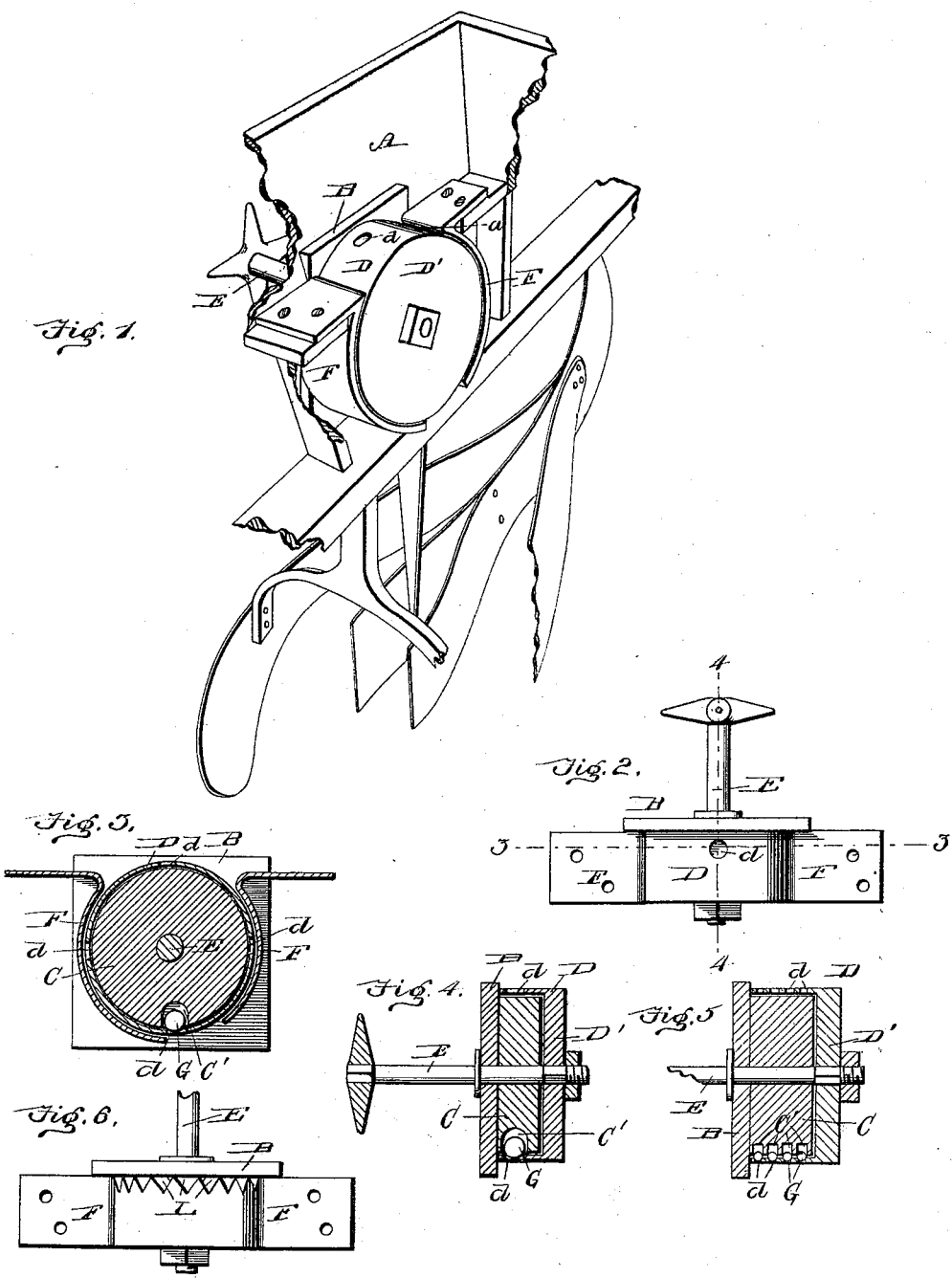

EDWIN THOMPSON BASKIN, OF MALTA BEND, MISSOURI.

FEED FOR PLANTERS.

SPECIFICATION forming part of Letters Patent No. 641,429, dated January 16, 1900.

Application filed October 14, 1899. Serial No. 733,655. (No model.)

*To all whom it may concern:*

Be it known that I, EDWIN THOMPSON BASKIN, a citizen of the United States, residing at Malta Bend, in the county of Saline and State of Missouri, have invented certain new and useful Improvements in Feeds for Planters; and I do hereby declare the following to be a full, clear, and exact description of the invention, such as will enable others skilled in the art to which it appertains to make and use the same.

This invention relates to a new and useful improvement in feeds for grain-drills; and its object, among other things, is to provide a feed of simple and durable construction, rendering cogs, springs, and other complicated machinery heretofore used in this connection unnecessary, and which will be accurate, prevent clogging, require a minimum amount of power for operation, and may be readily attached to planters in present use.

To these ends the invention consists in the novel construction and combination of parts hereinafter more fully described and claimed, and illustrated in the accompanying drawings, showing the preferred form of my invention, and in which—

Figure 1 is a perspective view of the feed applied to a hopper, a portion of said hopper broken away. Fig. 2 is a top plan view of the feed. Fig. 3 is a section on line 3 3, Fig. 2. Fig. 4 is a section on line 4 4, Fig. 2. Figs. 5 and 6 are views of modified forms of feeds.

Referring to said figures by letters of reference, A is a hopper having a small outlet $a$ at the bottom thereof, to one side of which is secured a plate B, from the center of which projects a short cylindrical knob C, provided in its under surface with a socket C' for the purpose hereinafter described. Bearing upon and inclosing this knob C is a cup-like cylinder D, to the end D' of which is firmly secured a shaft E, driven by any suitable means, as a chain and sprocket. The perimeter or sides of the cylinder D are perforated at desired points, as at $d$, and these perforations, which are closed on the inside by the knob C, serve as pockets for the seed, as hereinafter described. Partially inclosing the sides of the cylinder D are plates, as F, preferably so arranged that but two pockets $d$ are exposed at one time—*i. e.*, one at the top and within the opening in the hopper and the other at the bottom above the drill. These plates bear closely against the sides of the revolving cylinder, and thus keep the seed in pockets thereof until the point of discharge is reached.

In operation motion is imparted to the cylinder D by a chain-wheel on the end of shaft E. Seed will fall from the hopper into the pockets $d$ as they are successively exposed, and is carried therein and protected, as described above, by plates F to the opening of said plates directly above the drill, when it is permitted to drop. To prevent clogging of the seed within the pockets, a ball, as G, is placed within the socket C'. As the pockets arrive at the place of discharge the ball G comes into register therewith and dropping partly thereinto forces the seed outward. This operation is repeated for each pocket, the walls of the emptied pocket forcing the ball back into its socket as the cylinder continues its revolution.

It is obvious that more than one pocket can be fed and emptied at once, and in Fig. 5 I have shown a modified form of cylinder in which a number of pockets are arranged in series with their corresponding balls and sockets.

In lieu of providing pockets as described, notches, as L, (shown in Fig. 6,) may be formed in the cylinder. This form of feed is especially adapted for dropping small seeds.

It will be understood that the plates F may, if desired, be made adjustable to cylinders of different sizes.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus fully described my invention, what I claim, and desire to secure by Letters Patent, is—

1. In a device of the character described the combination of a stationary knob having a socket therein, a cylinder having perforations or recesses in its periphery, said cylinder adapted to retain a ball loosely seated within said sockets, and plates inclosing the sides of the cylinder and spaced apart at the top and bottom thereof, for the purpose and substantially as described.

2. In a device of the character described the combination, with a hopper, of plates secured to the bottom thereof, a knob, a cylinder mounted on said knob and between the plates, a ball loosely mounted within a socket in the knob and adapted to register with recesses formed within the periphery of the cylinder, and means for revolving said cylinder upon the knob, said plates adapted to retain seed within the recesses of the cylinder when revolving in either direction, substantially as described.

In testimony whereof I affix my signature in presence of two witnesses.

EDWIN THOMPSON BASKIN.

Witnesses:
EBENEZER ROZELL,
JNO. T. LINE.